US012663933B2

(12) United States Patent
Zhang

(10) Patent No.: US 12,663,933 B2
(45) Date of Patent: Jun. 23, 2026

(54) STORAGE MANAGEMENT SYSTEM FOR MANAGING RESOURCES IN POOLING MODE, METHOD, DEVICE, AND MACHINE-READABLE STORAGE MEDIUM

(71) Applicant: New H3C Information Technologies Co., Ltd., Zhejiang (CN)

(72) Inventor: Tianjie Zhang, Beijing (CN)

(73) Assignee: NEW H3C INFORMATION TECHNOLOGIES CO., LTD., Zhejiang (CN)

( * ) Notice: Subject to any disclaimer, the term of this patent is extended or adjusted under 35 U.S.C. 154(b) by 0 days.

(21) Appl. No.: 18/969,856

(22) Filed: Dec. 5, 2024

(65) Prior Publication Data

US 2025/0208778 A1　Jun. 26, 2025

(30) Foreign Application Priority Data

Dec. 20, 2023　(CN) .......................... 202311770686.8

(51) Int. Cl.
*G06F 3/06* (2006.01)

(52) U.S. Cl.
CPC .......... G06F 3/0644 (2013.01); G06F 3/0604 (2013.01); G06F 3/067 (2013.01)

(58) Field of Classification Search
CPC ....... G06F 3/0644; G06F 3/0604; G06F 3/067
See application file for complete search history.

(56) References Cited

U.S. PATENT DOCUMENTS

| | | | | |
|---|---|---|---|---|
| 2018/0150485 A1* | 5/2018 | Tripathy | ............. | G06F 16/1748 |
| 2018/0262413 A1* | 9/2018 | Sureka | ................ | H04L 41/0896 |
| 2022/0342720 A1* | 10/2022 | Lincourt, Jr. | ..... | H04L 67/10015 |
| 2025/0224999 A1* | 7/2025 | Yuan | ..................... | G06F 9/5083 |

FOREIGN PATENT DOCUMENTS

| | | |
|---|---|---|
| CN | 116185641 A | 5/2023 |
| CN | 117076140 A | 11/2023 |

OTHER PUBLICATIONS

Su Donggong et al. CN117076140, PE2E translation of IDS entry #2 (Year: 2023).*
European Patent Office, Extended European Search Report Issued in Application No. 24217587.5, Apr. 15, 2025, Germany, 10 pages.
Anonymous: "Memory hierarchy—Wikipedia", XP093266526, Oct. 21, 2023, 4 pages.

* cited by examiner

*Primary Examiner* — Eric Cardwell
(74) *Attorney, Agent, or Firm* — Greenblum & Bernstein, P.L.C.

(57) ABSTRACT

The present disclosure provides a storage management system, method, device, and machine-readable storage medium, the system including: a controller pool, to interact to-be-stored data and/or to-be-read data with an external device via network communication; a memory pool, to read and write high-speed temporary data and/or high-speed persistent data; an accelerator pool, to call a corresponding accelerator to process and distribute data according to a storage service type associated with data; a storage pool, to store to-be-stored data processed by the accelerator pool and/or read the to-be-read data; and a transmission module, to establish a system transmission network among the controller pool, the memory pool, the accelerator pool and the storage pool.

18 Claims, 2 Drawing Sheets

Receive, via a system transmission network, to-be-stored data parsed by a non-specific controller unit within a controller pool, where the to-be-stored data is sent from a remote device　S21

Persist the to-be-stored data through non-volatile memory units and feeding back persistence result information, where the persistence result information is for enabling a non-specific controller unit within an associated controller pool to feed back writing completion information to the remote device　S22

Store the to-be-stored data, after being processed by an accelerator pool, into a storage pool via the system transmission network　S23

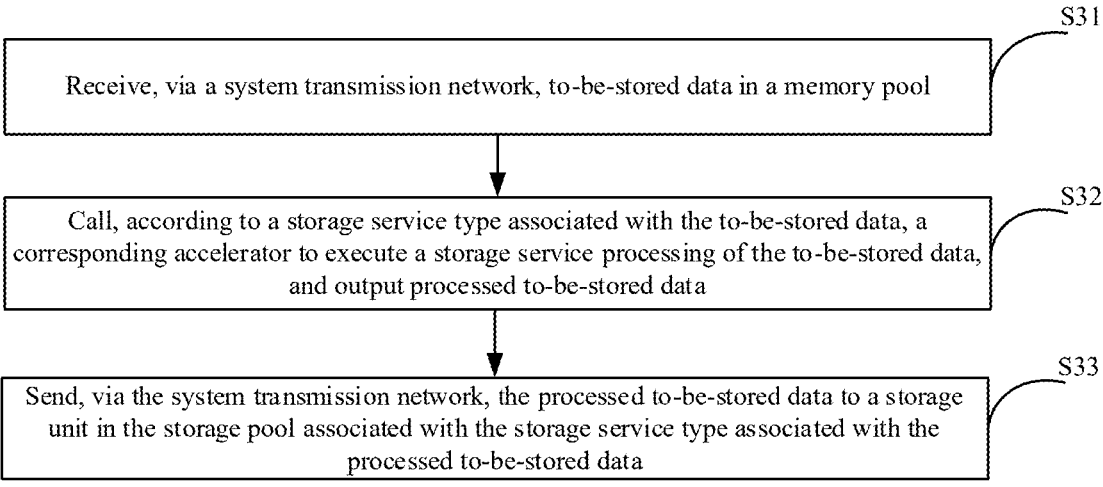

Receive, via a system transmission network, to-be-stored data in a memory pool ⌐S31

Call, according to a storage service type associated with the to-be-stored data, a corresponding accelerator to execute a storage service processing of the to-be-stored data, and output processed to-be-stored data ⌐S32

Send, via the system transmission network, the processed to-be-stored data to a storage unit in the storage pool associated with the storage service type associated with the processed to-be-stored data ⌐S33

FIG. 3

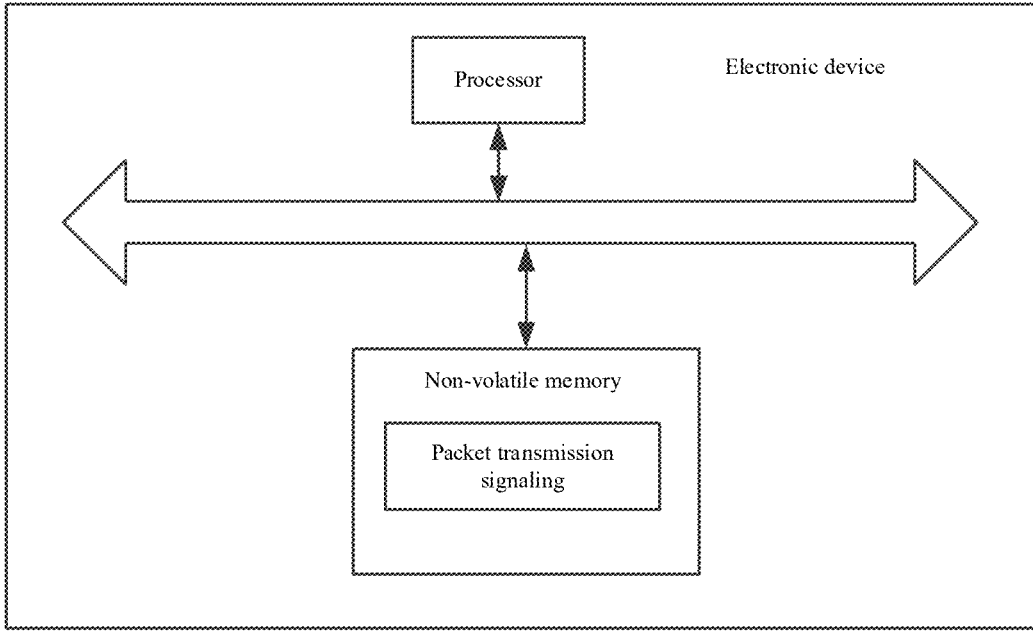

Electronic device

Processor

Non-volatile memory

Packet transmission signaling

FIG. 4

STORAGE MANAGEMENT SYSTEM FOR MANAGING RESOURCES IN POOLING MODE, METHOD, DEVICE, AND MACHINE-READABLE STORAGE MEDIUM

CROSS-REFERENCE TO RELATED APPLICATIONS

This application claims priority to Chinese Patent Application No. 202311770686.8, filed on Dec. 20, 2023, the disclosure of which is incorporated herein by reference in its entirety for all purposes.

TECHNICAL FIELD

The present disclosure relates to the field of communication technologies and, in particular, to a storage management system, method, device and machine-readable storage medium.

BACKGROUND

A storage system refers to a combination of hardware and software used for storing and managing data, responsible for storing, accessing and protecting data, and providing reliability, scalability, and high performance of data.

Compute express link (CXL) protocol is an open standard for high-performance computing systems that provides a mechanism for high-speed interconnection and memory expansion to transmit data between host systems and external devices.

In application scenarios such as high performance computing (HPC), storage systems are often required to have good scalability in order to flexibly expand capacity and performance; at the same time, storage systems are required to provide hundreds of gigabytes per second (GB/s) or even higher bandwidth. For this reason, current commercial storage systems are often based on storage servers and use distributed architecture to build storage clusters.

A distributed storage cluster consists of several storage servers. Each storage server includes a central processing unit (CPU), a hard disk (solid state drive (SSD) or hard disk drive (HDD)), a peripheral component interconnect express (PCIe) link, a redundant array of independent disk (RAID) card/host bus adapter (HBA) card, a hardware accelerator (such as DSA), etc. The host is connected to the storage cluster through a front-end network switch, and the host's read and write operations to the storage cluster are processed by this switch. Generally, the storage cluster further includes a back-end network switch, and data replication, data reconstruction and cluster control information of the storage cluster are generally processed by this switch.

Domain-specific architecture (DSA) is a computer architecture designed and optimized for a specific application field, aiming at meeting needs and requirements of a specific field and providing high-performance, high-efficiency and highly customized solutions. In the storage field, DSA generally refers to specific hardware accelerators, including data processing unit (DPU), field-programmable gate array (FPGA), application-specific integrated circuit (ASIC), etc., specific acceleration processing capabilities include storage protocol unloading, network protocol (such as remote direct memory access (RDMA), transmission control protocol (TCP), etc.) unloading, EC acceleration, encryption and decryption acceleration, fingerprint calculation acceleration, etc.

Erasure coding (EC) is a data protection method, which divides data into segments, expands and codes redundant data blocks, and stores them in different locations. EC is an extension of RAID technology.

The distributed storage system has some disadvantages, such as insufficient resource reuse capability, inflexible resource expansion, insufficient network communication capability, and low data moving efficiency in the storage system.

SUMMARY

In view of this, the present disclosure provides a storage management system, method, device and machine-readable storage medium to improve at least one of the above-mentioned technical problems.

The specific technical solutions are described following.

The present disclosure provides a storage management system, including: a controller pool, including a plurality of controller units, where each of the controller units includes a processor and an operating cache, and the controller pool is to interact to-be-stored data and/or to-be-read data with an external device via network communication; a memory pool, including a plurality of volatile memory units and/or a plurality of non-volatile memory units, and the memory pool is to read and write high-speed temporary data and/or high-speed persistent data; an accelerator pool, including a plurality of accelerator sub-pools respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; a storage pool, including a plurality of storage units, where the storage pool is to store to-be-stored data processed by the accelerator pool and/or read the to-be-read data; and a transmission module, to establish a system transmission network among the controller pool, the memory pool, the accelerator pool and the storage pool, and the system transmission network is to carry and transmit interactive data among the controller pool, the memory pool, the accelerator pool and the storage pool.

As a technical solution, the controller pool is further to unload controller units, and a number of controller units included in the controller pool decreases after the controller pool unloads the controller units, or, the controller pool is further to load controller units, and a number of controller units included in the controller pool increases after the controller pool loads the controller units; and/or, the memory pool is further to unload volatile memory units and/or non-volatile memory units, and a number of volatile memory units and/or non-volatile memory units included in the memory pool decreases after the memory pool unloads the volatile memory units and/or the non-volatile memory units, or, the memory pool is further to load volatile memory units and/or non-volatile memory units, and a number of volatile memory units and/or non-volatile memory units included in the memory pool increases after the memory pool loads the volatile memory units and/or the non-volatile memory units; and/or, for each of the accelerator sub-pools, the accelerator sub-pool is further to unload associated accelerators, and a number of associated accelerators included in the accelerator sub-pool decreases after the accelerator sub-pool unloads the associated accelerators, or, the accelerator sub-pool is further to load associated accelerators, and a number of associated accelerators included in the accelerator sub-pool increases after the accelerator sub-pool loads the associated accelerators; and/or, the storage pool is further to unload storage units, a number of storage units included in the storage pool decreases after the storage pool unloads storage units, or, the storage pool is further to load storage units, a number of storage units included in the storage pool increases after the storage pool loads storage units.

As a technical solution, the memory pool is further to: receiving a change in memory data of the memory pool by a non-specific controller unit within the controller pool and allowing other controller units within the controller pool to know the changed memory data, where the change includes addition, deletion or modification.

As a technical solution, the memory pool includes the plurality of non-volatile memory units, and the memory pool is further to: receiving, via the system transmission network, to-be-stored data parsed by a non-specific controller unit within the controller pool, where the to-be-stored data is sent from a remote device; persisting the to-be-stored data through the non-volatile memory units and feeding back persistence result information, where the persistence result information is for enabling a non-specific controller unit within an associated controller pool to feed back writing completion information to the remote device; and storing the to-be-stored data, after being processed by the accelerator pool, into the storage pool via the system transmission network.

As a technical solution, the accelerator pool is further to: receiving, via the system transmission network, to-be-stored data in the memory pool; calling, according to a storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data.

As a technical solution, the system further includes a secondary hard disk pool, where the secondary hard disk pool includes a plurality of hard disks, and the secondary hard disk pool is connected to the transmission module through a remote network and connected to the system transmission network; the storage pool is further to analyze access probability of data stored in the storage pool, and migrate, via the system transmission network, data with low access probability to a corresponding hard disk in the secondary hard disk pool for storage.

As a technical solution, in response to data reading signaling from a remote device, confirming the to-be-read data according to the data reading signaling, searching for the to-be-read data in a step-by-step order of operating caches of controller units within the controller pool, the memory pool, and the storage pool, and returning the to-be-read data to the remote device after hitting the to-be-read data in a step-by-step search process, and stopping a subsequent step-by-step search process.

As a technical solution, the method is performed by a memory pool, and the method includes: receiving, via a system transmission network, to-be-stored data parsed by a non-specific controller unit within a controller pool, where the to-be-stored data is sent from a remote device; persisting the to-be-stored data through the non-volatile memory units and feeding back persistence result information, where the persistence result information is for enabling a non-specific controller unit within an associated controller pool to feed back writing completion information to the remote device; and storing the to-be-stored data, after being processed by an accelerator pool, into a storage pool via the system transmission network; where, the system transmission network is established by a transmission module among the controller pool, the memory pool, the accelerator pool and the storage pool, and the system transmission network is to carry and transmit interactive data among the controller pool, the memory pool, the accelerator pool and the storage pool; the controller pool includes a plurality of controller units, where each of the controller units includes a processor and an operating cache, and the controller pool is to interact to-be-stored data and/or to-be-read data with an external device via network communication; the memory pool includes a plurality of volatile memory units and/or a plurality of non-volatile memory units, and the memory pool is to read and write high-speed temporary data and/or high-speed persistent data; the accelerator pool includes a plurality of accelerator sub-pools respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; and the storage pool includes a plurality of storage units, where the storage pool is to store to-be-stored data processed by the accelerator pool and/or read the to-be-read data.

As a technical solution, receiving a change in memory data of the memory pool by a non-specific controller unit within the controller pool and allowing other controller units within the controller pool to know the changed memory data, where the change includes addition, deletion or modification.

The present disclosure also provides a storage management method, which is performed an accelerator pool, and the method includes: receiving, via a system transmission network, to-be-stored data in the memory pool; calling, according to a storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data; where, the system transmission network is established by a transmission module among the controller pool, the memory pool, the accelerator pool and the storage pool, and the system transmission network is to carry and transmit interactive data among the controller pool, the memory pool, the accelerator pool and the storage pool; the controller pool includes a plurality of controller units, where each of the controller units includes a processor and an operating cache, and the controller pool is to interact to-be-stored data and/or to-be-read data with an external device via network communication; the memory pool includes a plurality of volatile memory units and/or a plurality of non-volatile memory units, and the memory pool is to read and write high-speed temporary data and/or high-speed persistent data; the accelerator pool includes a plurality of accelerator sub-pools respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; and the storage pool includes a plurality of storage units, where the storage pool is to store to-be-stored data processed by the accelerator pool and/or read the to-be-read data.

The present disclosure also provides an electronic device, including a processor and a machine-readable storage medium, where the machine-readable storage medium stores machine-executable instructions that may be executed by the processor, and the processor executes the machine-executable instructions to realize the aforementioned storage management method.

The present disclosure also provides a machine-readable storage medium, which stores machine-executable instructions, and when the machine-executable instructions are called and executed by a processor, cause the processor to realize the aforementioned storage management method.

The present disclosure also provides a storage management device, including: a controller server, including a plurality of controller units, where each of the controller units includes a processor and an operating cache, and the controller server is to interact to-be-stored data and/or to-be-read data with an external device via network communication; a memory server, including a plurality of volatile memory units and/or a plurality of non-volatile memory units, and the memory server is to read and write high-speed temporary data and/or high-speed persistent data; an accelerator server, including a plurality of accelerator modules respectively associated with different storage service types, each of the accelerator modules includes a plurality of accelerators dedicated to storage service types associated with the accelerator module, and the accelerator server is for calling a corresponding accelerator to process and distributing data according to a storage service type associated with data; a storage server, including a plurality of storage units, where the storage server is to store to-be-stored data processed by the accelerator pool and/or read the to-be-read data; and a CXL switch, to connect the controller server, the memory server, the accelerator server and the storage server via a CXL interface and establish a system transmission network, and the system transmission network is to carry and transmit interactive data among the controller server, the memory server, the accelerator server and the storage server.

The above technical solution provided by the present disclosure brings at least the following beneficial effects.

A storage cluster is reconstructed, various controller units, each including a main processor and a supporting operating cache, are composed of the controller pool, large-capacity volatile memory and non-volatile memory are composed of the memory pool, hardware accelerators of different storage service types are composed of the accelerator pool, storage units such as high-speed hard disks are composed of the storage pool, all key hardware resources are established in a pooled manner, and then all pooled hardware resources are connected through the system transmission network, thereby achieving high resource reuse capability. This prevents situations where some components of certain types of hardware resources are underperforming while other components of the same type are idle. Additionally, resource expansion and customization are flexible, allowing for adjustment of an overall performance of a resource pool by configuring the number of component units within each type of pooled hardware resource. This avoids scenarios where one type of hardware resource is underperforming while another type of hardware resource is over-resourced.

BRIEF DESCRIPTION OF DRAWINGS

In order to explain the examples of the present disclosure or the technical solutions in the prior art more clearly, the accompanying drawings needed to be used in the description of the examples of the present disclosure or the prior art will be briefly introduced below. Obviously, the accompanying drawings in the following description are only some of the examples recorded in the present disclosure. For those skilled in the art, other accompanying drawings may be obtained according to these accompanying drawings of the examples of the present disclosure.

FIG. 3 is a flowchart of a storage management method in an example of the present disclosure.

FIG. 4 is a hardware structure diagram of an electronic device in an example of the present disclosure.

DETAILED DESCRIPTION

Figure 1:
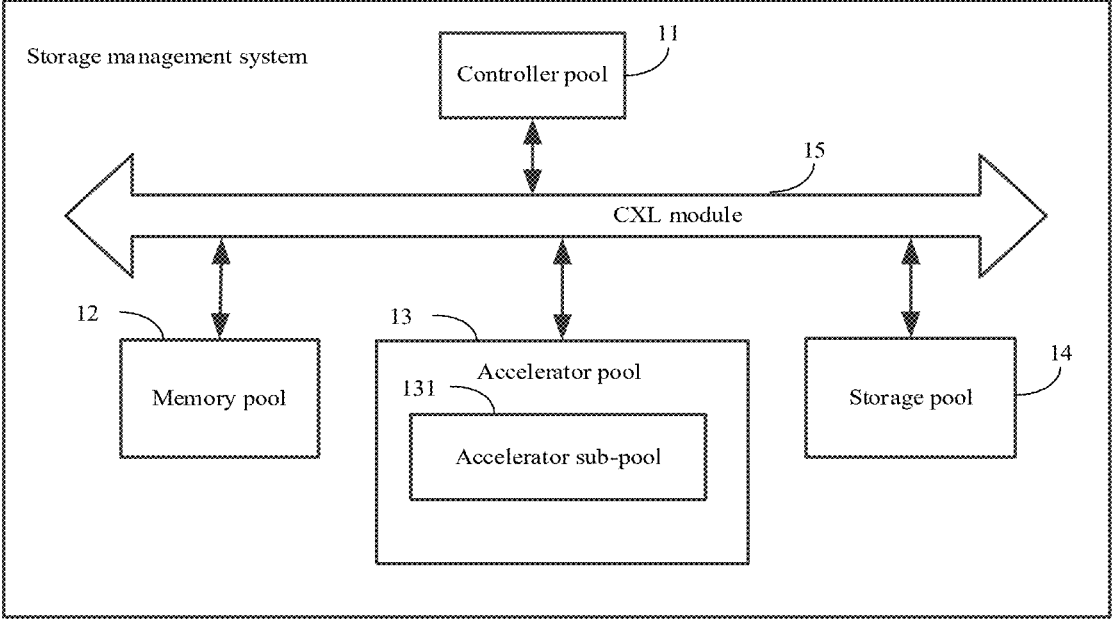
FIG. 1 is a schematic diagram of a storage management system in an example of the present disclosure.

The terminology used in the examples of the present disclosure is used solely for the purpose of describing particular examples and is not intended to limit the present disclosure. Singular forms of "a", "said", and "the" used in the present disclosure and in the claims are also intended to include majority forms, unless the context clearly indicates otherwise. It should also be understood that the term "and/or" as used herein refers to any or all of the possible combinations containing one or more of the listed items in association.

It should be understood that although terms first, second, third, etc. may be used to describe various information in the examples of the present disclosure, these information should not be limited to these terms. These terms are used only to distinguish the same type of information from one another. For example, without departing from the scope of the present disclosure, first information may also be named as second information, and similarly, the second information may also be named as the first information. Depending on the context, in addition, the word "if" used may be interpreted as "at" or "when" or "in response to determining".

In a technical solution, a distributed storage cluster consists of several storage servers. Each storage memory includes a CPU, a hard disk (SSD or HDD), a PCIe link, an RAID card/HBA card (optional), hardware accelerator (DSA, optional), etc. The host is connected to the storage cluster through a front-end network switch, and the host's read and write operations to the storage cluster are processed by this switch. Generally, the storage cluster further includes a back-end network switch, and data replication, data reconstruction and cluster control information of the storage cluster are generally processed by this switch.

There are technical problems in the above solutions, such as insufficient resource reuse capability, and hardware nodes of each storage server are independent from each other, making it difficult to fully reuse hardware capabilities. This may lead to insufficient hardware resources (such as CPU, memory, DSA, etc.) on some nodes at certain times, while other nodes experience excess resources. Additionally, resource expansion lacks flexibility, as distributed storage systems must expand hardware resources on a storage server basis. This will cause waste of resources in some cases. For example, when only the CPU capacity is insufficient while other resources are adequate, the entire storage server (including other resources) must still be expanded. In terms of network communication capacity, current distributed storage primarily relies on TCP/IP or RDMA networks, from a system perspective, communication between storage servers necessitates the use of TCP/IP or RDMA network protocol stacks, resulting in higher latency and inefficient communication. Additionally, the efficiency of data migration within the storage system is low, which is related to both the hardware architecture and software implementation of distributed storage, from a hardware perspective, the inability to share hardware resources (such as memory) leads to multiple migrations of data between storage servers, thereby reducing efficiency.

In view of this, the present disclosure provides a storage management system, method, device and machine-readable storage medium to at least improve the above technical problems.

The specific technical solutions are described below.

In an example, as shown in FIG. 1, the present disclosure provides a storage management system, including: a controller pool 11, including a plurality of controller units, where each of the controller units includes a processor and an operating cache, and the controller pool is to interact to-be-stored data and/or to-be-read data with an external device via network communication; a memory pool 12, including a plurality of volatile memory units and/or a plurality of non-volatile memory units, and the memory pool is to read and write high-speed temporary data and/or high-speed persistent data; an accelerator pool 13, including a plurality of accelerator sub-pools 131 respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; a storage pool 14, including a plurality of storage units, where the storage pool is to store to-be-stored data processed by the accelerator pool and/or read the to-be-read data; and a transmission module 15, to establish a system transmission network among the controller pool, the memory pool, the accelerator pool and the storage pool, and the system transmission network is to carry and transmit interactive data among the controller pool, the memory pool, the accelerator pool and the storage pool.

In the above example, a storage cluster is reconstructed, various controller units, each including a main processor and a supporting operating cache, are composed of the controller pool, large-capacity volatile memory and non-volatile memory are composed of the memory pool, hardware accelerators of different storage service types are composed of the accelerator pool, storage units such as high-speed hard disks are composed of the storage pool, all key hardware resources are established in a pooled manner, and then all pooled hardware resources are connected through the system transmission network, thereby achieving high resource reuse capability. This prevents situations where some components of certain types of hardware resources are underperforming while other components of the same type are idle. Additionally, resource expansion and customization are flexible, allowing for adjustment of an overall performance of a resource pool by configuring the number of component units within each type of pooled hardware resource. This avoids scenarios where one type of hardware resource is underperforming while another type of hardware resource is over-resourced.

In the example of the present disclosure, data may be transmitted between various pooled hardware resources through a high-bandwidth, low-latency transmission network, such as a PCIe channel, or for example, a transmission network based on CXL technology may be selected to meet requirements of high bandwidth and low latency. Therefore, the transmission module may be a CXL module, such as a CXL switch, and the corresponding system transmission network is a CXL transmission network. CXL 3.0 technology or newer versions may be chosen as the protocol. A system transmission network based on CXL 3.0 technology may fulfill the requirements for network transmission performance and network characteristics in the example of the present disclosure, from the perspective of technical architecture.

In an example, the controller pool is further to unload controller units, and a number of controller units included in the controller pool decreases after the controller pool unloads the controller units, or, the controller pool is further to load controller units, and a number of controller units included in the controller pool increases after the controller pool loads the controller units; and/or, the memory pool is further to unload volatile memory units and/or non-volatile memory units, and a number of volatile memory units and/or non-volatile memory units included in the memory pool decreases after the memory pool unloads the volatile memory units and/or the non-volatile memory units, or, the memory pool is further to load volatile memory units and/or non-volatile memory units, and a number of volatile memory units and/or non-volatile memory units included in the memory pool increases after the memory pool loads the volatile memory units and/or the non-volatile memory units; and/or, for each of the accelerator sub-pools, the accelerator sub-pool is further to unload associated accelerators, and a number of associated accelerators included in the accelerator sub-pool decreases after the accelerator sub-pool unloads the associated accelerators, or, the accelerator sub-pool is further to load associated accelerators, and a number of associated accelerators included in the accelerator sub-pool increases after the accelerator sub-pool loads the associated accelerators; and/or, the storage pool is further to unload storage units, a number of storage units included in the storage pool decreases after the storage pool unloads storage units, or, the storage pool is further to load storage units, a number of storage units included in the storage pool increases after the storage pool loads storage units.

In an example, the memory pool is further to: receiving a change in memory data of the memory pool by a non-specific controller unit within the controller pool and allowing other controller units within the controller pool to know the changed memory data, where the change includes addition, deletion or modification.

As a technical solution, the memory pool includes the plurality of non-volatile memory units, and the memory pool is further to: receiving, via the system transmission network, to-be-stored data parsed by a non-specific controller unit within the controller pool, where the to-be-stored data is sent from a remote device; persisting the to-be-stored data through the non-volatile memory units and feeding back persistence result information, where the persistence result information is for enabling a non-specific controller unit within an associated controller pool to feed back writing completion information to the remote device; and storing the to-be-stored data, after being processed by the accelerator pool, into the storage pool via the system transmission network.

In an example, the accelerator pool is further to: receiving, via the system transmission network, to-be-stored data in the memory pool; calling, according to a storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data.

In an example, the system further includes a secondary hard disk pool, where the secondary hard disk pool includes a plurality of hard disks, and the secondary hard disk pool is connected to the transmission module through a remote network and connected to the system transmission network; the storage pool is further to analyze access probability of data stored in the storage pool, and migrate, via the system transmission network, data with low access probability to a corresponding hard disk in the secondary hard disk pool for storage.

In an example, in response to data reading signaling from a remote device, confirming the to-be-read data according to the data reading signaling, searching for the to-be-read data in a step-by-step order of operating caches of controller units within the controller pool, the memory pool, and the storage pool, and returning the to-be-read data to the remote device after hitting the to-be-read data in a step-by-step search process, and stopping a subsequent step-by-step search process.

In an example, as a technical solution, the method is performed by a memory pool, and the method includes: receiving, via a system transmission network, to-be-stored data parsed by a non-specific controller unit within a controller pool, where the to-be-stored data is sent from a remote device; persisting the to-be-stored data through the non-volatile memory units and feeding back persistence result information, where the persistence result information is for enabling a non-specific controller unit within an associated controller pool to feed back writing completion information to the remote device; and storing the to-be-stored data, after being processed by an accelerator pool, into a storage pool via the system transmission network; where, the system transmission network is established by a transmission module among the controller pool, the memory pool, the accelerator pool and the storage pool, and the system transmission network is to carry and transmit interactive data among the controller pool, the memory pool, the accelerator pool and the storage pool; the controller pool includes a plurality of controller units, where each of the controller units includes a processor and an operating cache, and the controller pool is to interact to-be-stored data and/or to-be-read data with an external device via network communication; the memory pool includes a plurality of volatile memory units and/or a plurality of non-volatile memory units, and the memory pool is to read and write high-speed temporary data and/or high-speed persistent data; the accelerator pool includes a plurality of accelerator sub-pools respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; and the storage pool includes a plurality of storage units, where the storage pool is to store to-be-stored data processed by the accelerator pool and/or read the to-be-read data.

Figure 2:
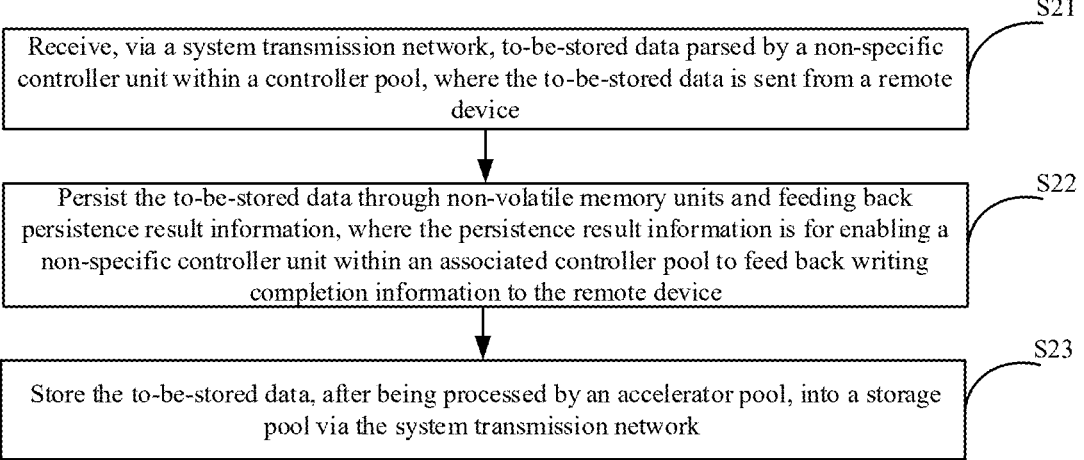
FIG. 2 is a flowchart of a storage management method in an example of the present disclosure.

Specifically, as shown in FIG. 2, it includes the following processes:

at process S21: receiving, via a system transmission network, to-be-stored data parsed by a non-specific controller unit within a controller pool, where the to-be-stored data is sent from a remote device;

at process S22: persisting the to-be-stored data through non-volatile memory units and feeding back persistence result information, where the persistence result information is for enabling a non-specific controller unit within an associated controller pool to feed back writing completion information to the remote device; and at process S23: storing the to-be-stored data, after being processed by an accelerator pool, into a storage pool via the system transmission network.

In an example, receiving a change in memory data of the memory pool by a non-specific controller unit within the controller pool and allowing other controller units within the controller pool to know the changed memory data, where the change includes addition, deletion or modification.

In an example, the present disclosure also provides a storage management method, which is performed an accelerator pool, and the method includes: receiving, via the system transmission network, to-be-stored data in the memory pool; calling, according to the storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data; where, the system transmission network is established by a transmission module among the controller pool, the memory pool, the accelerator pool and the storage pool, and the system transmission network is to carry and transmit interactive data among the controller pool, the memory pool, the accelerator pool and the storage pool; the controller pool includes a plurality of controller units, where each of the controller units includes a processor and an operating cache, and the controller pool is to interact to-be-stored data and/or to-be-read data with an external device via network communication; the memory pool includes a plurality of volatile memory units and/or a plurality of non-volatile memory units, and the memory pool is to read and write high-speed temporary data and/or high-speed persistent data; the accelerator pool includes a plurality of accelerator sub-pools respectively associated with different storage service types, each of the accelerator sub-pools includes a plurality of accelerators dedicated to storage service types associated with the accelerator sub-pool, and the accelerator pool is for calling a corresponding accelerator to process and distributing data according to a storage service type associated with data; and the storage pool includes a plurality of storage units, where the storage pool is to store to-be-stored data processed by the accelerator pool and/or read the to-be-read data.

Specifically, as shown in FIG. 3, it includes the following processes:

at process S31: receiving, via a system transmission network, to-be-stored data in a memory pool;

at process S32: calling, according to a storage service type associated with the to-be-stored data, a corresponding accelerator to execute a storage service processing of the to-be-stored data, and outputting processed to-be-stored data; and at process S33, sending, via the system transmission network, the processed to-be-stored data to a storage unit in the storage pool associated with the storage service type associated with the processed to-be-stored data.

In an example, the present disclosure also provides a storage management device, including: a controller server, including a plurality of controller units, where each of the controller units includes a processor and an operating cache, and the controller server is to interact to-be-stored data and/or to-be-read data with an external device via network communication; a memory server, including a plurality of volatile memory units and/or a plurality of non-volatile memory units, and the memory server is to read and write high-speed temporary data and/or high-speed persistent data; an accelerator server, including a plurality of accelerator modules respectively associated with different storage service types, each of the accelerator modules includes a plurality of accelerators dedicated to storage service types associated with the accelerator module, and the accelerator server is for calling a corresponding accelerator to process and distributing data according to a storage service type associated with data; a storage server, including a plurality of storage units, where the storage server is to store to-be-stored data processed by the accelerator pool and/or read the to-be-read data; and a CXL switch, to connect the controller server, the memory server, the accelerator server and the storage server via a CXL interface and establish a system transmission network, and the system transmission network is to carry and transmit interactive data among the controller server, the memory server, the accelerator server and the storage server.

In an example, based on CXL 3.0 technology and the goal of separation of management and control, a high-performance storage management system with composable capabilities is realized, which has the technical effects of flexible reuse, on-demand expansion, flexible service arrangement, low delay, high Input/Output Operations Per Second (IOPS), high bandwidth and so on.

The storage management system includes:

a controller pool, which is composed of multiple storage controllers. Components of a controller mainly include CPU, memory used as CPU operation cache, etc. The controllers in the controller pool may be configured identically or differently. Their main functions include handling storage protocols (SCSI, NVMe, NFS, S3, etc.) as the storage Target or Server end, as well as front-end network protocols (such as TCP/IP, RDMA, etc.);

a memory pool for expanding controller memory, may include one or more sub-pools, such as double data rate synchronous dynamic random access memory (DDR) memory sub-pools and non-volatile memory (e.g., storage class memory (SCM)) sub-pools. DDR memory sub-pools are used for high-speed temporary data read/write (cache) and transformation, while SCM sub-pools are primarily used for high-speed persistent data read/write, typically for logs and metadata;

an accelerator pool, which may include one or more accelerator sub-pools. The main function of the accelerator pool is to provide hardware acceleration for storage services in a pooled capacity. Typical storage service functions include EC, deduplication fingerprint calculation, compression, encryption and decryption, network protocol processing, etc. The accelerator (DSA) may be optionally configured to use high speed memory (HBM) as a Cache depending on the type and function;

a storage pool, for example, using a high-speed SSD hard disk (including one or more JBOF (Just a Bunch Of Flash) cages), the storage pool serves as a primary storage, which mainly stores persistent (in the form of replicas or EC) hot data;

a CXL module, which supports a switching architecture of CXL 3.0 protocol, may be composed of a single device, such as CXL switch, or multiple devices that meet the protocol specifications. Other pooled hardware resources are directly or indirectly connected to CXL module to form CXL transmission network.

In addition, the storage management system may further include:

a secondary hard disk pool, which mainly includes medium-to-low speed SSD hard disks and/or HDD hard disks, the secondary hard disk pool serves as secondary storage, mainly for storing persistent warm data (in the form of replicas or EC). A data relationship between the secondary hard disk pool and the primary hard disk pool may be hierarchical storage relationship or cache data relationship.

RDMA or TCP/IP network connection module, through which CXL module connects to secondary hard disk pool, enabling remote deployment of the secondary hard disk pool.

In this example, the pooled hardware resources may be logically virtualized, where each hardware module of each storage node is virtually constructed into a hardware pool based on hardware type. In some examples, the pooled hardware resources may be physically pooled, where single or multiple devices containing several hardware units of the same type are specifically set up to form a hardware resource pool centered around the same hardware type.

In this example, the storage management system dynamically adds or removes hardware units in the hardware resource pools by configuring loading and unloading of the plugged hardware units, thereby achieving dynamic changes in hardware resources. These resources include the controller pool, the memory pool, the accelerator pool, the storage pool, and the secondary hard disk pool. Dynamic changes refer to dynamic addition or deletion of resource pools and dynamic addition or deletion of specific resources within the resource pools. The dynamic changes of resource pools are primarily managed by a resource configuration subsystem. The management here includes resource discovery, configuration, mapping relationships, etc. Based on the above loading and unloading functions, targeted adjustment of modules with mismatched performance overhead and hardware resource configuration is achieved, avoiding the technical problem of inflexible resource expansion based on storage nodes in the storage cluster.

In this example, when storing data, an external device host A that needs to store data sends a packet to the controller pool based on a storage protocol (iSCSI, NVMe over Fabric, NFS, etc.), which is processed by a controller unit B in the controller pool. The controller unit B parses protocols (including storage protocols and related network protocols) and persists the data and metadata to the memory pool through the CXL transport network, using methods such as replicas or EC. After the memory pool completes the persistence of this part of data, the controller unit B returns a write completion to host A, thereby achieving rapid response and efficient processing feedback for data storage.

Subsequently, based on service orchestration functions configured by a storage service control module, accelerators in the accelerator pool are matched to complete the hardware acceleration of data. The accelerator pool may include multiple accelerator resources based on different services. This step may involve multiple sub-steps, with multiple accelerators processing data in a pipeline manner. Data interaction from the memory pool to the accelerator pool may utilize the CXL transport network to interact data in a Peer-to-Peer (P2P) manner, effectively reducing the consumption of CPU resources within the controller pool. After the accelerator pool completes data processing, the data is again stored into the storage pool using the CXL transport network in a P2P direct memory access (DMA manner), in which, according to different storage service types, the data is directly stored in the corresponding storage unit, thus reducing the number of data transfers. Subsequently, based on a preconfigured data tiering (or caching) strategy, data may be stored into the secondary hard disk pool.

Compared to a distributed storage architecture based on the storage server, this example effectively reduces the number of data movements within the system, improves system efficiency, thereby enhancing the IOPS and bandwidth of the storage system, and improving hardware utilization. The component pools are loosely coupled, and hardware resources are fully utilized through statistical multiplexing.

In this example, when reading data, an external device host C initiates a read command to the controller pool, processed by a controller unit D in the controller pool. The controller unit D processes and parses the command. If it hits a local cache, it returns the data directly. Otherwise, it searches in the memory pool. If it hits, it returns the data. If not, it searches in the storage pool. If it hits, it returns the data. If not, it searches in the secondary hard disk pool and returns the data, thereby achieving step-by-step data searching to return the to-be-read data as quickly as possible.

In an example, the present disclosure provides an electronic device, including a processor and a machine-readable storage medium, where the machine-readable storage medium stores machine-executable instructions that may be executed by the processor, and the processor executes the machine-executable instructions to realize the aforementioned storage management method. From a hardware perspective, a schematic diagram of a hardware architecture may be seen in FIG. 4.

In an example, the present disclosure provides a machine-readable storage medium that stores machine-executable instructions, which, when invoked and executed by a processor, cause the processor to realize the aforementioned storage management method.

The machine-readable storage medium may be any electronic, magnetic, optical or other physical storage apparatus, and may contain or store information, such as executable instructions, data, and the like. For example, the machine-readable storage medium may be: a random access memory (RAM), a volatile memory, a non-volatile memory, a flash memory, a storage drive (e.g., a hard disk drive), a solid state drive, any type of storage disk (e.g., optical disk, dvd, etc.), or similar storage medium, or a combination thereof.

The systems, apparatuses, modules or units illustrated in the above examples may specifically be realized by a computer chip or an entity, or by a product with a certain function. A typical implementation device is a computer, and a specific form of the computer may be a personal computer, a laptop computer, a cellular telephone, a camera phone, a smart phone, a personal digital assistant, a media player, a navigation device, an e-mail transceiver, a gaming console, a tablet computer, a wearable device, or a combination of any of these devices.

For the convenience of description, when describing the above apparatus, the functions are divided into various units and described separately. Of course, the functions of each unit may be implemented in the same or multiple software and/or hardware when the present disclosure is implemented.

It should be understood by those skilled in the art that examples of the present disclosure may be provided as a method, a system, or a computer program product. Therefore, the present disclosure may take the form of an entirely hardware example, an entirely software example, or an example combining software and hardware aspects. Moreover, examples of the present disclosure may take the form of a computer program product implemented on one or more computer-usable storage media (including but not limited to disk storage, compact disc read-only memory (CD-ROM), optical storage, etc.) containing computer-usable program codes.

The present disclosure is described with reference to flowcharts and/or block diagrams of methods, devices (systems), and computer program products according to the examples of the present disclosure. It should be understood that each flow and/or block in the flowcharts and/or block diagrams, and combinations of the flow and/or block in the flowcharts and/or block diagrams may be implemented by computer program instructions. These computer program instructions may be provided to a processor of a general-purpose computer, a special-purpose computer, an embedded processor or other programmable data processing device to produce a machine, such that instructions which are executed by a processor of the computer or other programmable data processing device produce an apparatus for implementing the functions specified in one or more flows of the flowcharts and/or one or more blocks of the block diagrams.

Moreover, these computer program instructions may also be stored in a computer-readable memory that may direct a computer or other programmable data processing device to function in a particular manner, such that the instructions stored in the computer-readable memory produce an article of manufacture including an instruction apparatus that implements the functions specified in one or more flows of the flowcharts and/or one or more blocks of the block diagrams.

These computer program instructions may also be loaded onto a computer or other programmable data processing devices, such that a series of operational steps are performed on the computer or other programmable devices to produce a computer-implemented process, such that the instructions executed on the computer or other programmable devices provides steps for implementing the functions specified in one or more flows of the flowcharts and/or one or more blocks of the block diagrams.

It should be understood by those skilled in the art that examples of the present disclosure may be provided as a method, a system, or a computer program product. Therefore, the present disclosure may take the form of an entirely hardware example, an entirely software example, or an example combining software and hardware aspects. Moreover, the present disclosure may take the form of a computer program product implemented on one or more computer-usable storage media (which may include, but not limited to, disk storage, CD-ROM, optical storage, etc.) containing computer-usable program codes.

The above are merely examples of the present disclosure and is not intended to limit the present disclosure. Various modifications and variations of the present disclosure will occur to those skilled in the art. Any modifications, equivalent substitutions, improvements, etc. made within the principle of the present disclosure should be included in the scope of the claims of the present disclosure.

What is claimed is:

1. A storage management system, comprising:

a controller pool, comprising a plurality of controller units, wherein each of the controller units comprises a processor and an operating cache, and the controller pool is to interact to-be-stored data or to-be-read data or both with an external device via network communication;

a memory pool, comprising a plurality of volatile memory units and a plurality of non-volatile memory units, and the memory pool is to read and write high-speed temporary data or high-speed persistent data or both;

an accelerator pool, comprising a plurality of accelerator sub-pools respectively associated with different storage service types, each of the accelerator sub-pools comprises a plurality of accelerators dedicated to storage service types associated with the accelerator sub-pool, and the accelerator pool is for calling a corresponding accelerator to process and distributing data according to a storage service type associated with data;

a storage pool, comprising a plurality of storage units, wherein the storage pool is to store to-be-stored data processed by the accelerator pool or read the to-be-read data or both; and a transmission module, to establish a system transmission network among the controller pool, the memory pool, the accelerator pool and the storage pool, and the system transmission network is to carry and transmit interactive data among the controller pool, the memory pool, the accelerator pool and the storage pool;

wherein the memory pool is further to:

receive, via the system transmission network, to-be-stored data parsed by a non-specific controller unit within the controller pool, wherein the to-be-stored data is sent from a remote device;

persist the to-be-stored data through the non-volatile memory units and feed back persistence result information, wherein the persistence result information is for enabling a non-specific controller unit within an associated controller pool to feed back writing completion information to the remote device; and store the to-be-stored data, after being processed by the accelerator pool, into the storage pool via the system transmission network.

2. The system according to claim 1, wherein, the controller pool is further to unload controller units, and a number of controller units comprised in the controller pool decreases after the controller pool unloads the controller units, or, the controller pool is further to load controller units, and a number of controller units comprised in the controller pool increases after the controller pool loads the controller units.

3. The system according to claim 1, wherein, the memory pool is further to unload volatile memory units or non-volatile memory units or both, a number of volatile memory units comprised in the memory pool decreases after the memory pool unloads the volatile memory units, or a number of non-volatile memory units comprised in the memory pool decreases after the memory pool unloads the non-volatile memory units, or both;

or, the memory pool is further to load volatile memory units or non-volatile memory units or both, a number of volatile memory units comprised in the memory pool increases after the memory pool loads the volatile memory units, or a number of non-volatile memory units comprised in the memory pool increases after the memory pool loads the non-volatile memory units, or both.

4. The system according to claim 1, wherein, for each of the accelerator sub-pools, the accelerator sub-pool is further to unload associated accelerators, and a number of associated accelerators comprised in the accelerator sub-pool decreases after the accelerator sub-pool unloads the associated accelerators, or, the accelerator sub-pool is further to load associated accelerators, and a number of associated accelerators comprised in the accelerator sub-pool increases after the accelerator sub-pool loads the associated accelerators.

5. The system according to claim 1, wherein, the storage pool is further to unload storage units, a number of storage units comprised in the storage pool decreases after the storage pool unloads storage units, or, the storage pool is further to load storage units, a number of storage units comprised in the storage pool increases after the storage pool loads storage units.

6. The system according to claim 1, wherein the memory pool is further to:

receiving a change in memory data of the memory pool by a non-specific controller unit within the controller pool and allowing other controller units within the controller pool to know the changed memory data, wherein the change comprises addition, deletion or modification.

7. The system according to claim 1, wherein the accelerator pool is further to:

receiving, via the system transmission network, to-be-stored data in the memory pool;

calling, according to a storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data.

8. The system according to claim 1, further comprising: a secondary hard disk pool, wherein the secondary hard disk pool comprises a plurality of hard disks, and the secondary hard disk pool is connected to the transmission module through a remote network and connected to the system transmission network;

the storage pool is further to analyze access probability of data stored in the storage pool, and migrate, via the system transmission network, data with low access probability to a corresponding hard disk in the secondary hard disk pool for storage.

9. The system according to claim 1, wherein in response to data reading signaling from a remote device, confirming the to-be-read data according to the data reading signaling, searching for the to-be-read data in a step-by-step order of operating caches of controller units within the controller pool, the memory pool, and the storage pool, and returning the to-be-read data to the remote device after hitting the to-be-read data in a step-by-step search process, and stopping a subsequent step-by-step search process.

10. A storage management method, performed by a memory pool and comprising:

receiving, via a system transmission network, to-be-stored data parsed by a non-specific controller unit within a controller pool, wherein the to-be-stored data is sent from a remote device;

persisting the to-be-stored data through a non-volatile memory units and feeding back persistence result information, wherein the persistence result information is for enabling a non-specific controller unit within an associated controller pool to feed back writing completion information to the remote device; and storing the to-be-stored data, after being processed by an accelerator pool, into a storage pool via the system transmission network;

wherein, the system transmission network is established by a transmission module among the controller pool, the memory pool, the accelerator pool and the storage pool, and the system transmission network is to carry and transmit interactive data among the controller pool, the memory pool, the accelerator pool and the storage pool;

the controller pool comprises a plurality of controller units, wherein each of the controller units comprises a processor and an operating cache, and the controller pool is to interact to-be-stored data or to-be-read data or both with an external device via network communication;

the memory pool comprises a plurality of volatile memory units or a plurality of non-volatile memory units or both, and the memory pool is to read and write high-speed temporary data or high-speed persistent data or both;

the accelerator pool comprises a plurality of accelerator sub-pools respectively associated with different storage service types, each of the accelerator sub-pools comprises a plurality of accelerators dedicated to storage service types associated with the accelerator sub-pool, and the accelerator pool is for calling a corresponding accelerator to process and distributing data according to a storage service type associated with data; and the storage pool comprises a plurality of storage units, wherein the storage pool is to store to-be-stored data processed by the accelerator pool or read the to-be-read data or both.

11. The method according to claim 10, wherein, receiving a change in memory data of the memory pool by a non-specific controller unit within the controller pool and allowing other controller units within the controller pool to know the changed memory data, wherein the change comprises addition, deletion or modification.

12. A storage management method, performed by an accelerator pool and comprising:

receiving, via a system transmission network, to-be-stored data in a memory pool;

calling, according to a storage service type associated with the to-be-stored data, a corresponding accelerator to execute a storage service processing of the to-be-stored data, and outputting processed to-be-stored data; and sending, via the system transmission network, the processed to-be-stored data to a storage unit in the storage pool associated with the storage service type associated with the processed to-be-stored data, so that the corresponding storage unit stores the processed to-be-stored data;

wherein, the system transmission network is established by a transmission module among the controller pool, the memory pool, the accelerator pool and the storage pool, and the system transmission network is to carry and transmit interactive data among the controller pool, the memory pool, the accelerator pool and the storage pool;

the controller pool comprises a plurality of controller units, wherein each of the controller units comprises a processor and an operating cache, and the controller pool is to interact to-be-stored data or to-be-read data or both with an external device via network communication;

the memory pool comprises a plurality of volatile memory units and a plurality of non-volatile memory units, and the memory pool is to read and write high-speed temporary data or high-speed persistent data or both;

the accelerator pool comprises a plurality of accelerator sub-pools respectively associated with different storage service types, each of the accelerator sub-pools comprises a plurality of accelerators dedicated to storage service types associated with the accelerator sub-pool, and the accelerator pool is for calling a corresponding accelerator to process and distributing data according to a storage service type associated with data; and the storage pool comprises a plurality of storage units, wherein the storage pool is to store to-be-stored data processed by the accelerator pool or read the to-be-read data or both;

wherein the memory pool is further to:

receive, via the system transmission network, to-be-stored data parsed by a non-specific controller unit within the controller pool, wherein the to-be-stored data is sent from a remote device;

persist the to-be-stored data through the non-volatile memory units and feed back persistence result information, wherein the persistence result information is for enabling a non-specific controller unit within an associated controller pool to feed back writing completion information to the remote device; and store the to-be-stored data, after being processed by the accelerator pool, into the storage pool via the system transmission network.

13. An electronic device, comprising a processor and a machine-readable storage medium, wherein the machine-readable storage medium stores machine-executable instructions executable by the processor, and the processor is to execute the machine-executable instructions to implement the method according to claim 10.

14. The electronic device according to claim 13, wherein the processor is further to:

receive a change in memory data of the memory pool by a non-specific controller unit within the controller pool and allowing other controller units within the controller pool to know the changed memory data, wherein the change comprises addition, deletion or modification.

15. An electronic device, comprising a processor and a machine-readable storage medium, wherein the machine-readable storage medium stores machine-executable instructions executable by the processor, and the processor is to execute the machine-executable instructions to implement the method according to claim 12.

16. A non-transitory machine-readable storage medium storing machine-executable instructions, wherein the machine-executable instructions are executed by a processor, the machine-executable instructions cause the processor to realize the method according to claim 10.

17. The non-transitory machine-readable storage medium according to claim 16, wherein the processor is further to:

receive a change in memory data of the memory pool by a non-specific controller unit within the controller pool and allowing other controller units within the controller pool to know the changed memory data, wherein the change comprises addition, deletion or modification.

18. A non-transitory machine-readable storage medium storing machine-executable instructions, wherein the machine-executable instructions are executed by a processor, the machine-executable instructions cause the processor to realize the method according to claim 12.

\* \* \* \* \*